T. C. CRAVEN.
Horse Hay Fork.
No. 55,824.
Patented June. 26, 1866.
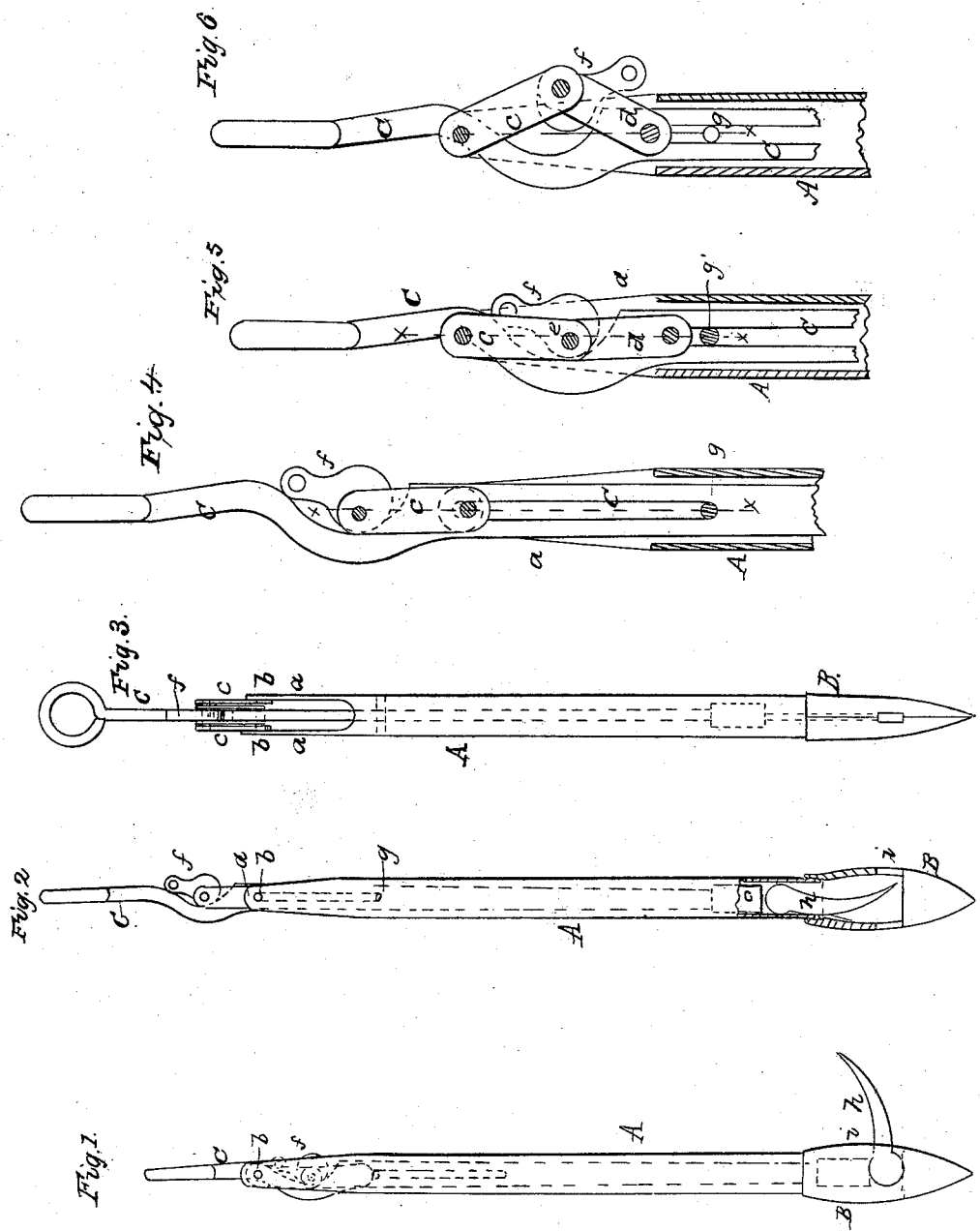

UNITED STATES PATENT OFFICE.

THOMAS C. CRAVEN, OF ALBANY, NEW YORK.

IMPROVEMENT IN HORSE HAY-FORKS.

Specification forming part of Letters Patent No. 55,824, dated June 26, 1866.

*To all whom it may concern:*

Be it known that I, T. C. CRAVEN, of Albany, in the county of Albany and State of New York, have invented a new and Improved Harpoon Hay-Fork; and I do hereby declare that the following is a full, clear, and exact description thereof, reference being had to the accompanying drawings, making a part of this specification, in which—

Figure 1 is a side view of my improved fork, showing one barb or hook projecting from its point. Fig. 2 is a view of the fork with the barb or tooth retracted. Fig. 3 is an edge view of the fork. Fig. 4 is an enlarged sectional view of the upper portion of the fork, showing the position of the jointed levers for plunging the spear into a load of hay. Fig. 5 is a similar view, showing the parts adjusted in position for projecting the barb and elevating a load. Fig. 6 shows the same parts in the act of releasing the barb and load.

Similar letters of reference indicate corresponding parts in the several figures.

My invention relates to certain novel improvements in that class of forks which are designed for elevating hay upon wagons and stacks and into barns, and which are distinguished from other forks for this purpose by the name of "harpoon-forks," from their resemblance to a harpoon-lance.

These forks are so constructed that when they are plunged into a body of hay barbs or teeth will be projected from their spear-shaped points and attach themselves to a quantity of hay, which can then be elevated to any desired point, and when it is desired to deposit the load thus elevated the barbs are retracted.

One of the objects of my invention is to so apply one or more barbs or hooked teeth to a spear-point of a harpoon hay-fork that these barbs can be projected and retracted at pleasure without having them attached to the rod which is used for projecting such barbs and holding them in a position for sustaining a load of hay, thereby insuring the discharge of the load when the barbs are released, as will be hereinafter described.

Another object of my invention is to employ toggle-jointed levers in conjunction with a rod which is used for projecting the barbs or hooks from a hollow spear-point, and also as a handle by which the fork is lifted, said levers being so applied as to serve as a means for locking the said rod in two positions, one position for plunging the instrument into a body of hay and the other position for projecting the barbs, as will be hereinafter described.

Another object of my invention is to apply an eccentric tripping-lever to the jointed locking-levers, as a means for unlocking the same when it is desired to project the barbs or to allow of their retraction, as will be hereinafter described.

To enable others skilled in the art to understand my invention, I will describe its construction and operation.

In the accompanying drawings, A represents the hollow staff of the harpoon hay-fork, and B is a hollow spear-head, which is suitably secured to one end of the staff. This spear-point may be made of any suitable shape and length, but it is preferable to have it of the form and relative thickness shown in the drawings, so that it will readily penetrate a mass of hay or straw, and also allow of the free discharge of the load from the staff.

The staff A terminates at its upper end in two flat side plates, *a a*, which are perforated to receive the short pivots *b b* that connect two levers, *c c*, to said staff. The opposite ends of these levers *c c* are pivoted to two levers, *d d*, by means of a pin, *e*, which is also the pivot for an eccentric tripping device, *f*, as shown in the drawings. The levers *a a* are also pivoted to a rod, C, which extends down into the hollow staff A, and is kept in the center thereof by a pin, *g*, which passes transversely through staff A and through an oblong slot which is through the rod C, as shown in Figs. 1, 2, 4, and 5.

The upper end of the rod C is curved, as shown in the drawings, for the purpose of allowing levers *c d* to be moved in the positions shown in Figs. 4 and 5 and the pivot-pin *e* to be brought in a line with the center of the rod C and its staff. This curved portion of the rod C terminates at its upper end in an eye, to which a chain or rope is attached in using the instrument.

The hollow spear-point B contains a curved hook or barb, *h*, which may be made of the form shown in the drawings, Figs. 1 and 2, or of any other form which will answer as good a purpose. This hook is made with an enlarged head on its inner end, which is sufficiently large to prevent the hook from being drawn entirely through the hole $i$ which is made through the point B for the projection of the main portion of this hook, as shown in Fig. 1.

The length of the rod C is such that when it is drawn up as far as possible it will allow the hook or barb $h$ to pass entirely into the point B, as shown in Fig. 2, so that the instrument can be plunged into a mass of hay its full length if desired.

The interior or bottom surface of the point B may be made flat, as shown in Fig. 2, or this surface may be of any other conformation, provided it will support the hook $h$ within this point B and allow it to be projected, as shown in Fig. 1, by the descent of the rod C.

When the rod C is forced down and locked by the levers $c\ d$ its lower end will press upon the head of the hook $h$ and resist any ordinary strain or weight which may be brought upon the hook.

When the rod C is released and allowed to rise to the position shown in Fig. 2 in the tubular staff, the hook $h$ will be thrown into the point of this staff by the weight of the load upon it, and, should the point of the hook project slightly from the hollow-staff point when the instrument is plunged in a load of hay, said hook will be forced back to the position shown in Fig. 2.

The hook $h$ will not assume the position shown in Fig. 1 unless forced to this position by the rod C.

The manner of effecting the locking and unlocking of the rod C will now be explained, reference being had to the three enlarged figures, 4, 5, and 6.

The levers $c$ and $d$ form the well-known toggle-joints. The levers $c\ c$ being pivoted to the upper end of the staff A and the levers $d\ d$ being pivoted to the rod C, it will be seen that when this rod is depressed the levers will straighten out and allow the intermediate joint at $e$ to be pressed into the bent portion of the rod C, and this rod locked, as shown in Fig. 5. When the levers are in this position the instrument can be elevated by a chain or rope attached to the upper end of the rod C, and whatever weight may be upon the extended hook $h$ it will not have a tendency to unlock said levers nor become released from the instrument, for it will be seen that the weight of the load which is brought upon the levers will force the point $e$ against the bent portion of the rod $c$ and hold it in this position until moved outward and past a plane touching the axes of the upper and lower extremities of the levers. (Indicated in Figs. 4, 5, and 6 by a red line, $x\ x$.)

The tripping-lever or eccentric $f$ is used for effecting the unlocking of the levers when it is desired to discharge a load from the hook $h$. This lever $f$ is caused to press against the curved edge of the rod C and to move the joint at $e$ outward from said curved edge past the plane $x\ x$ above mentioned, when the weight upon the hook $h$ will cause the upper and lower extremities of the levers $c\ c\ d\ d$ to approach each other, as shown in Fig. 6, and to release the hook and its load. Then by depressing the rod C the levers will come together, and may be pressed into the curved portion of this rod, as shown in Figs. 2, 3, and 4, where they will be again locked, for the reason above stated, so that the instrument may be grasped by the rod C and plunged into a load of hay without said rod acting upon the hook $h$. This hook $h$ can be thrown out by releasing the rod C, and again held in this projected position by the locking-levers.

It is intended to have a cord or rope attached to tripping-lever $f$, for the purpose of operating it when the instrument has been elevated to a proper height for discharging a load.

It is also intended to employ more than one hook, $h$, and to arrange them so as to move alongside of each other, and to project from different points of the staff-point B. Whatever number of hooks or barbs may be employed, they will be applied loosely within the hollow point B and operated substantially in the manner herein described for the single hook.

Having thus described my invention, what I claim as new, and desire to secure by Letters Patent, is—

1. Applying a hook or barb, $h$, to the hollow point of a harpoon hay-fork, so that this hook shall work loosely within said point and be projected therefrom by the depression of a rod, C, substantially as described.

2. Connecting the upper portion of the curved rod C to the upper portion of its hollow staff A by means of toggle-joints, which are adapted to serve as a locking device, substantially as described.

3. The combination of the tripping-lever or eccentric $f$, or its equivalent, with locking toggle-levers and rod C, for the purpose of unlocking said rod.

4. Curving the upper portion of the rod C, for the purpose substantially as described.

Witness my hand in the matter of my application for a patent for my improved hay-fork.

THOS. C. CRAVEN.

Witnesses:
 R. T. CAMPBELL,
 EDW. F. BROWN.